United States Patent [19]

Eggert et al.

[11] Patent Number: 5,753,006
[45] Date of Patent: May 19, 1998

[54] METHOD FOR THE ALUMINOTHERMAL PRODUCTION OF MOLTEN STEEL

[75] Inventors: Horst Eggert, Dorsten; Michael Steinhorst, Essen, both of Germany

[73] Assignee: Elektro-Thermit GmbH, Essen, Germany

[21] Appl. No.: 772,350

[22] Filed: Dec. 20, 1996

[30] Foreign Application Priority Data

Dec. 22, 1995 [DE] Germany ............. 195 48 462.2

[51] Int. Cl.$^6$ ................................................. C21B 15/02
[52] U.S. Cl. ................. 75/500; 75/959; 164/54; 266/167
[58] Field of Search ............ 75/500, 959; 266/167; 164/54

[56] References Cited

U.S. PATENT DOCUMENTS 4,063,720 12/1977 Boutet et al. ........................ 266/167

FOREIGN PATENT DOCUMENTS

| 438 504 | 12/1926 | Germany. |
| 572 523 | 3/1933 | Germany. |
| 90 16 340 | 4/1991 | Germany. |
| 578 165 | 6/1946 | United Kingdom. |

OTHER PUBLICATIONS

Sargeant, "Holosphere—A Novel Ceramic Material", British Ceramic Transactions & Jrnl., 90, 1991, pp. 132–135, Jul.

Primary Examiner—Melvyn Andrews
Attorney, Agent, or Firm—Scully, Scott, Murphy & Presser

[57] ABSTRACT

Disclosed is a method for the aluminothermal production of molten steel for the aluminothermal welding of workpieces, wherein the aluminothermal reaction is carried out in a crucible made of porous or hollow spherical $\alpha$-$Al_2O_3$ with a density of 0.8–3.0 g/cm$^3$ and a bulk density of 0.3–1.8 g/cm$^3$.

2 Claims, No Drawings

METHOD FOR THE ALUMINOTHERMAL PRODUCTION OF MOLTEN STEEL

BACKGROUND OF THE INVENTION

The aluminothermal welding process utilizes a chemical reaction for the production of hot liquid welding material.

Here the great affinity of aluminum for oxygen is utilized, so as to reduce heavy metal oxides, preferably iron oxide.

The process, which takes place in a strongly exothermal manner, can be described as:

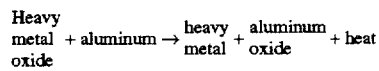

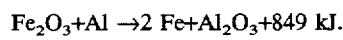

$Fe_2O_3 + Al \rightarrow 2\ Fe + Al_2O_3 + 849$ kJ.

The aluminothermal reaction takes place according to a point-like ignition with a suitable igniting agent, for example, a suitable ignition rod, in a crucible, in a few seconds, with strong development of heat. The reaction products, which become heated to over 2000° C., are separated subsequently, wherein the slag with the lighter specific weight ($Al_2O_3$) floats on the iron.

Granulated steel particles for the damping of the reaction and steel-forming agents, such as C, Mn, Cr, V and/or Mo, are intermixed with the basic components of the reaction mixture (iron oxide and aluminum) as particles with a small particle size.

The formed hot liquid THERMIT steel of defined composition is excellent for technical welding purposes.

The welding method can be characterized by the following work steps:

alignment of the workpieces, which are placed with a gap between them, dependent on the welding cross section and process;

molding of the welding site with a refractory mold;

preheating of the workpiece ends by means of special burners with a gas/air, gasoline/air, gasoline/oxygen, acetylene/oxygen, propane/air, or preferably propane/oxygen mixture;

pouring of the hot liquid steel into the mold and welding of the workpiece ends.

According to this process, workpieces of all types with any cross sections are welded during construction or repairs. Its most widespread use has been in the aluminothermal welding process during rail welding, because of its simple execution, independent of external energy sources.

With the welding process that is common today, the aluminothermal reaction takes place in a crucible, which is usually made of tabular oxide, magnesite, or $SiO_2$.

Multiple use of an $SiO_2$ crucible is not 30 possible because of the low melting point of $SiO_2$ (Tm=1723° C.) in comparison to $Al_2O_3$ (Tm=2072° C.) and MgO (Tm=2852° C.). Therefore, $Al_2O_3$ and MgO are preferred, wherein $Al_2O_3$ also has the advantage that it is a material of the same kind that is also formed during the aluminothermal reaction.

Preferably, therefore, crucibles which are made of tabular oxide are used. Tabular oxide is a massive $Al_2O_3$. In the THERMIT reaction, a mixture of aluminum, iron oxide, and alloy additives is brought to reaction in such a crucible, wherein, typically, temperatures of approximately 2100° C. are reached.

BRIEF SUMMARY OF THE INVENTION

It has surprisingly been determined that when using a THERMIT welding product of a given composition in a reaction crucible of identical configuration but produced from a porous or hollow spherical $\alpha$-$Al_2O_3$, that is, an $Al_2O_3$ of low density, namely a density of 0.8–3.0 g/cm³, and a bulk density (that is, an apparent density on packing), of 0.3 to 1.8 g/cm³, a clearly higher temperature of an average 2200° C. is attained. That is, the "density" is that of the $\alpha$-$Al_2O_3$ itself, and the bulk density is the apparent density of this particulate form in which the $\alpha$-$Al_2O_3$ is provided, when articles of this $\alpha$-$Al_2O_3$ are packed together. Surprisingly, an improved mold filling behavior of the molten steel is attained in this way such that the error rate, that is, the number of welds with defects in the fracture area, declines significantly, namely by approximately 25%, in comparison to the conventional method.

The object of the invention is thus a method for the aluminothermal production of molten steel, which is characterized by the fact that the aluminothermal reaction which produces the molten steel is carried out in a crucible made of porous $\alpha$-$Al_2O_3$.

DETAILED DESCRIPTION OF THE INVENTION

The reaction is carried out with particular preference in a crucible which exhibits a density of 1.0–2.0 g/cm³ and a bulk density of 0.4–1.4 g/cm³.

The lower error rate thus means a higher certainty of the welding and thus a higher reliability of the welding before failure.

The additional advantage of a crucible made of hollow $\alpha$-$Al_2O_3$ is the significantly lower weight, which is of greater importance from the perspective of the protection of the worker.

For carrying out this invention, porous corundums, which, for example, are produced by melting calcined argillaceous earths and blowing the melt with air, are especially suitable. Such corundum products, for example, known as spherical corundum, exhibit a considerably reduced density and low bulk density, in comparison to normal corundum (density, 3.97 g/cm³). The densities of such hollow aluminum oxides usually lie below 2 g/cm³ and the bulk densities are usually in the range of 0.3–1.5 g/cm³, depending on the particle distribution.

We claim:

1. An improved method for the aluminothermal production of molten steel for the aluminothermal welding of workpieces, wherein the improvement comprises carrying out the aluminothermal reaction in a crucible made of porous or hollow spherical $\alpha$-$Al_2O_3$ with a density of 0.8–3.0 g/cm³ and a bulk density of 0.3–1.8 g/cm³.

2. A method according to claim 1, wherein the aluminothermal reaction is carried out in a crucible made of porous or hollow spherical $\alpha$-$Al_2O_3$ with a density of 1.0–2.0 g/cm³ and a bulk density of 0.4–1.4 g/cm³.

* * * * *